United States Patent Office 3,521,891
Patented July 28, 1970

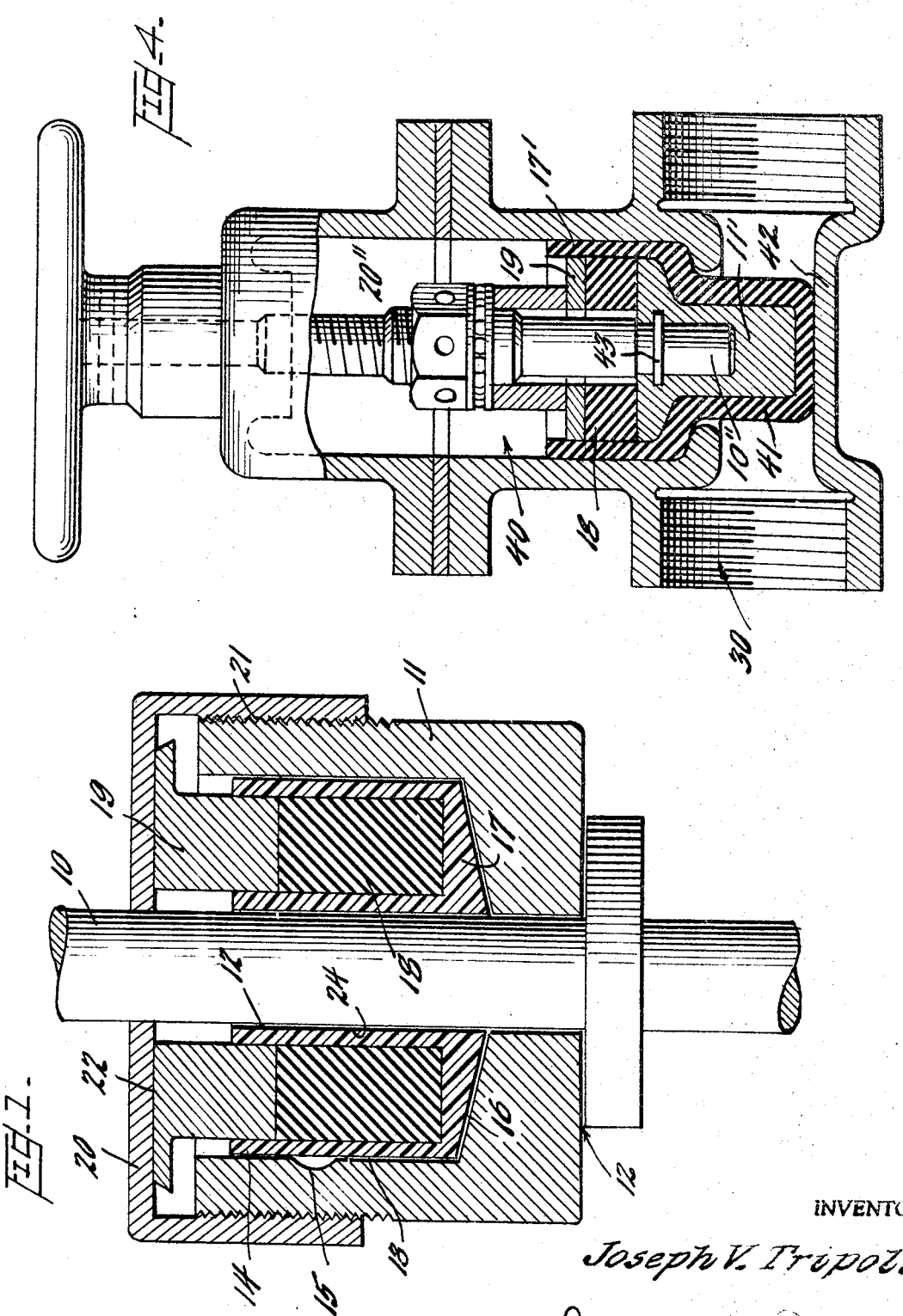

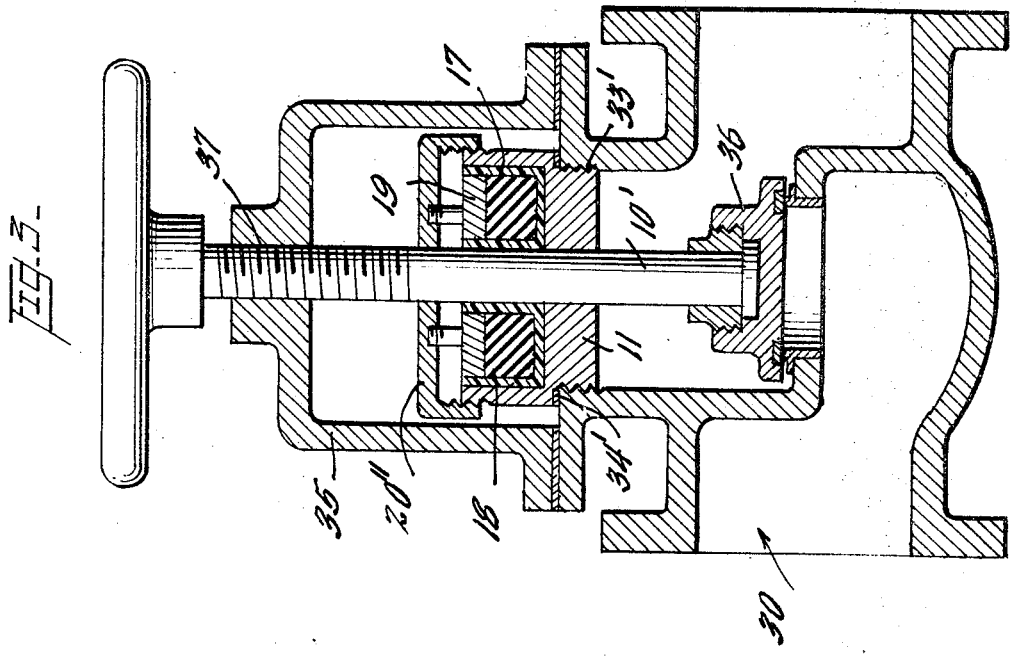
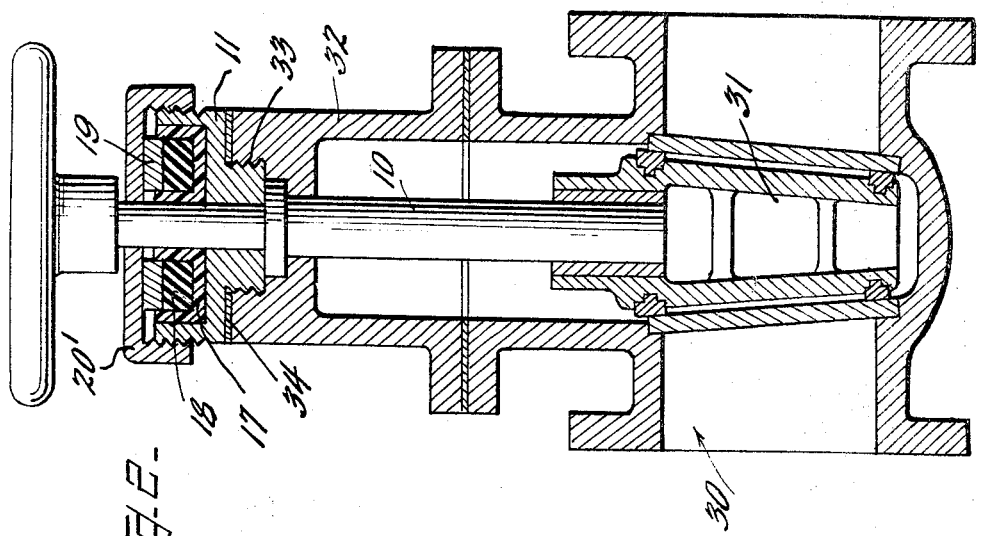

3,521,891
FLOW CONTROL SEALING CARTRIDGE
Joseph V. Tripoli, 329 Troy Del Way,
Williamsville, N.Y. 14221
Filed July 11, 1967, Ser. No. 652,606
Int. Cl. B65d 53/02; F16k 41/00
U.S. Cl. 277—110          5 Claims

ABSTRACT OF THE DISCLOSURE

Valves for controlling a flow of fluid under pressure require hermetic seals against leakage around movable members. A cartridge that can be used about a valve stem to seal it off from leakage is provided with a sealing contact member in the form of an annular cup-shaped ring or shell formed of "Teflon" or other tough, flexible, wear-resistant material positioned between the rotatable stem and an outer fixed retainer body. Inserted into the cup-shaped ring to almost fill it, is a ring of substantially rectangular, cross-section rubber or similiar resilient plastic material, leaving just enough room for insertion snugly in the shell to bear thereagainst a gland of metal or other hard substance. This is forced into the shell by adjustable means comprising a stuffing retainer and a threaded cap pushing the gland against the rubber insert to expand the shell radially into contact with the relatively movable valve surfaces and seal off the region about the movable stem from leakage.

---

This invention relates to valves and other flow control devices, and more particularly, it relates to structure in valves for preventing leakage or flow of fluids under pressure from regions about relatively movable valve parts.

Various sorts of flow control seals have been afforded in the prior art between movable and fixed parts of valves and fluid control devices including diaphragms separating the fluid pressure path from movable control members and assemblies of adjustable mechanisms for pressing flexible barriers in place to seal undesired passageways while permitting readjustment of sealing pressures after wear or aging. One such latter assembly is shown in my Pat. 3,259,358, issued July 5, 1966. Many problems exist in providing adjustment that effectively operates unformly over large surface areas of the relatively movable valve parts, particularly when cylindrical passageways are presented. Primarily, it has been difficult to produce a satisfactory radial component of force between two cylindrical members which will tend to flow a hermetic sealing barrier even into misshaped, worn or corroded portions of a movable surface. Also, it has been difficult to maintain a sealing force with equal pressure over relatively large surface areas, particularly where semi-rigid sealing materials are used, such as leather or "Teflon."

It is therefore an object of the invention to provide improved valve structure having movable parts sealed against leakage or undesired flow of fluids.

A more specific object of the invention is to provide barriers between relatively movable parts in valves and fluid control devices conveying fluids under pressure, which barriers conform over relatively large surface areas to close fluid leakage paths between the movable parts.

Further features and objectives together with an embodiment setting forth a preferred mode of operation of the invention will be found throughout the following detailed description which refers to the accompanying drawings, wherein:

FIG. 1 is a fragmental elevation view, partly in section, of a cartridge provided by this invention for sealing the space between two relatively movable valve members, and FIGS. 2–4 are elevation views, partly in section, of various valve arrangements embodying the invention.

Referring now to the arrangement of FIG. 1, it will be understood that the sealing cartridge is a part of a flow system with means for controlling the flow of a fluid under pressure, such as air, water, steam or a chemical. Thus, there is a movable control member such as a valve stem 10 which may be rotated or reciprocated during control of the flow process such as, for example, when a hand valve is turned to stop the flow of water or compressed air. However, because of fluid pressure, there is a tendency for the fluid to pass between the movable members, which in this embodiment, comprises an inner cylindrical metal shaft 10 and an outer body structure which may comprise at least a portion terminating in a relatively fixed retainer housing member 11, which may be a machined brass annular ring, for example.

There is a limit to practical tolerances that can be held in manufacture, and wear occurs as well as changes in dimensions due to temperature, corrosion, etc. Accordingly, a passageway 12 will exist which leads out between the relatively movable members 10 and 11, and which will permit loss of fluids if not sealed.

A cup-like member 14 is provided of a tough, flexible, wear-resistant material such as "Teflon" or leather that covers a relatively large surface area and tends to permit some degree of flow into misshapen areas such as ridges or defects 15 which may appear in the valve surfaces adjacent the passageway 12. This cup-like member 14 is an annular ring surrounding the stem 10 and substantially filling a cavity 16 within the packing box or retainer housing member 11 to rest therein and be firmly retained at the bottom 17 of the cup-like member 14 to substantially fill the space between the stem 10 and the housing member 11 and contact both over a relatively large surface area.

The interior of the cup member 14 is substantially rectangular in cross-section so that a simply formed plastic body 18 of rubber or other material having similar resilience may be received snugly therein to substantially fill the cup cavity but leaving room for a gland 19 of metal or hard plastic to be inserted snugly into the shell of cup member 14 and bear against the top of the inserted rubber body 18.

To permit adjustment of the radial sealing pressures between the cylindrical stem 10 and the outer cylindrical walls 19 of the housing member 11, a cap or nut 20 is affixed to the housing at threads 21 and serves to press gland 19 into the shell of cup member 14 at surface 22. Because of the resiliency of the rubber body 18, it simply provides the desired radial forces to hermetically seal the passageway 12 between the inner and outer members 10, 11 when pressure is applied tending to compress the rectangular cross-section. Thus, a significant degree of radial pressure is obtained without necessitating intricate machined or metal parts by using simply formed resilient parts without intricate shapes, wedging members or complex operations that tend to equalize or distribute pressures over the sealing surfaces. Thus, the radial sealing pressure is substantially equalized over both the cylindrical surface 19 of the housing member 11 and the cylindrical surface 24 of the stem 10 without providing any complex or expensive mechanical arrangement, yet provides long life and a large degree of adjustability to conform with wear and aging.

As may be seen from FIG. 2 a gate valve controls flow of fluids through channel 30 by means of rotatable stem 10 which rotates the gateways 31 within channel 30. In this type of valve the sealing cartridge is part of the outer housing 32 of the valve and may be affixed thereto by threads 33 which permit the retainer portion 11 to be tightened against washer 34. The adjustable means 20' in this embodiment comprises a screw cap enveloping the retainer 11.

In the globe valve of FIG. 3, the cartridge is mounted within the outer housing 35, and the retainer 11 is affixed to the housing by means of screw threads 33'. The flow control member 36 in this case is both rotated and reciprocated by means of screw threads 37 on stem 10' within the fixed position sealing cartridge assembly.

In the valve of FIG. 4, the retainer 11' for holding the bottom of the rubber ring 18, is affixed to the stem 10" by means of molding a hard body about retainer ring 43, for example. Thus, the entire cartridge assembly moves inside the valve cavity 40 with the integral flow control extension 41 of the cup-like shell 17', which conforms itself against the stop 42.

It is seen from the foregoing embodiments that improved valve structures are provided by the invention, and those features of novelty believed descriptive of the spirit and nature of the invention are defined with particularity in the appended claims.

What is claimed is:

1. A cartridge for hermetically sealing the spacing between a movable member and a fixed member of a flow control mechanism such as a valve, comprising in combination, an inner member and an outer member surrounding the inner member, said members being relatively movable, means for introducing a flow of fluid under pressure against both members and tending to pass fluid between the inner and outer members, a cup-like member of a tough, flexible, wear-resistant material positioned intermediate the members to surround the inner member and contact both members defining a shell having a thin inner wall, a thin outer wall and a closed end providing a substantially rectangular inner cross-section, an insert body of resilient plastic material substantially filling the shell and contacting the closed end, said body bearing upon the inner and outer walls with substantially constant pressure along the bearing surface when endwise pressure is applied between said flat end surfaces, a gland of hard substance having inner and outer end surfaces inserted snugly in the open end of the shell and contacting said inner and outer walls to substantially seal the cup opening and bear against the insert body to retain the entire said resilient insert body entirely within said shell, a retainer holding the bottom of the cup-like member firmly in position, and adjustable means engaging said gland and pushing it into said cup-like member against said retainer thereby forcing the resilient material thereinto and expanding the thin walls of the tough flexible material into contact with both the inner and outer members with a substantially equal pressure over a large surface area extending substantially along the length of the inner and outer members to produce a hermetic seal therebetween.

2. A cartridge as defined in claim 1, wherein the inner member comprises a rotatable cylindrical shaft, and the cup-like member is an annular ring concentrically positioned about the shaft.

3. A cartridge as defined in claim 2, wherein the retainer comprises a structure surrounding the cup-like member on its bottom and outer surfaces, and the adjustable means is a screw cap member threaded about a portion of the retainer.

4. A cartridge as defined in claim 1, wherein the flow control mechanism has an outer housing, said retainer comprises a portion of said outer housing, and said adjustable means comprises a screw cap member threaded about said retainer.

5. A cartridge as defined in claim 1, wherein the valve has an outer housing, said cartridge is located within said outer housing, said retainer is affixed to said housing, and the inner member contains a flow control member relatively movable within said housing.

References Cited

UNITED STATES PATENTS

| 2,567,527 | 9/1951 | Parks | 277—110 |
| 3,172,670 | 3/1965 | Pras | 277—112 |
| 3,259,358 | 7/1966 | Tripoli | 251—187 X |

FOREIGN PATENTS

| 42,737 | 9/1933 | France. |
| 480,868 | 8/1929 | Germany. |
| 759,233 | 10/1956 | Great Britain. |

LAVERNE D. GEIGER, Primary Examiner

J. S. MEDNICK, Assistant Examiner

U.S. Cl. X.R.

277—165, 205